United States Patent Office 3,736,125
Patented May 29, 1973

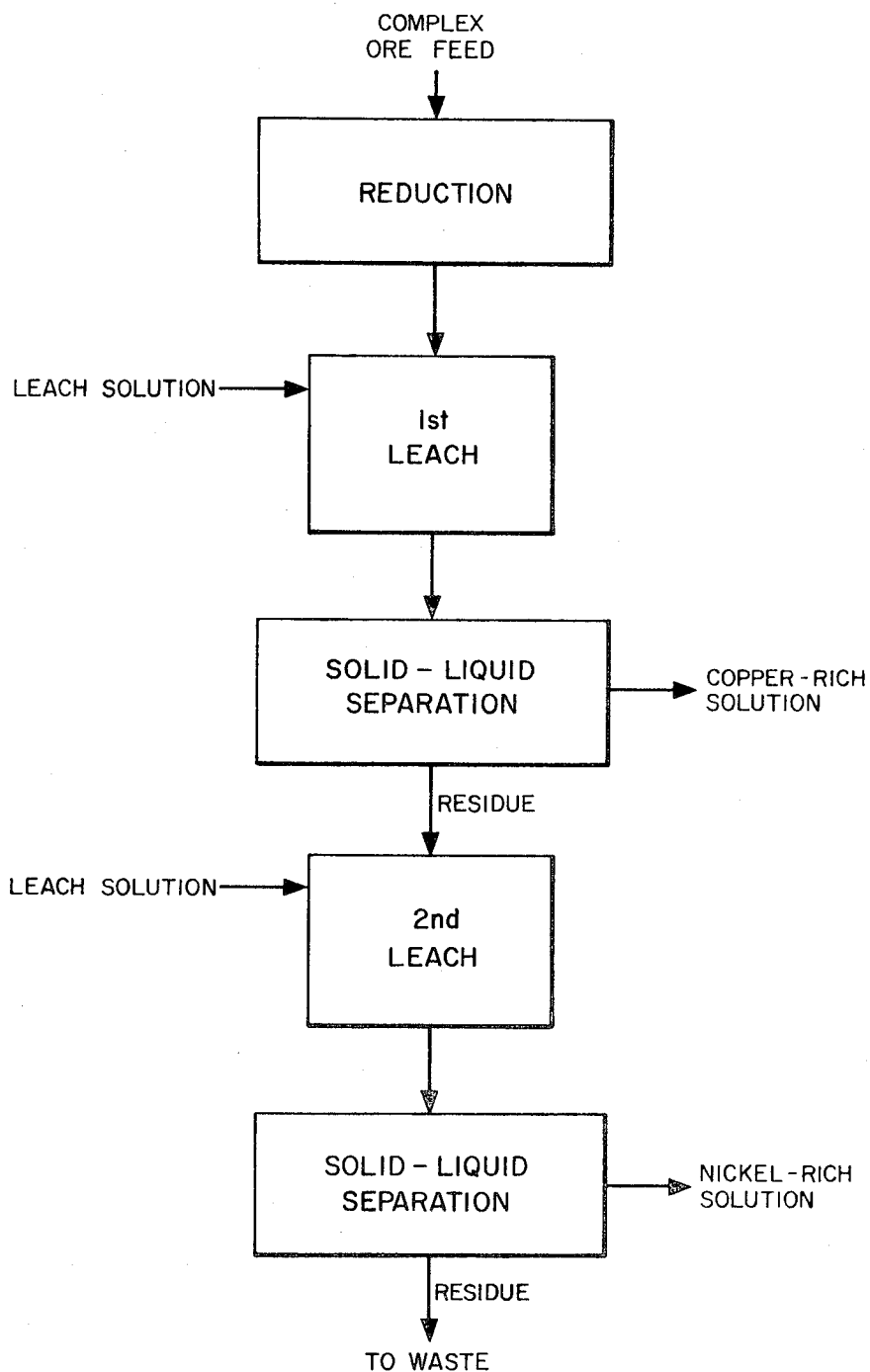

3,736,125
TWO STAGE SELECTIVE LEACHING OF COPPER AND NICKEL FROM COMPLEX ORE
Thomas C. Wilder, Cambridge, Mass., assignor to Kennecott Copper Corporation, New York, N.Y.
Filed July 16, 1970, Ser. No. 55,306
Int. Cl. C22b 3/00; C21b 1/02, 3/00
U.S. Cl. 75—21
4 Claims

ABSTRACT OF THE DISCLOSURE

Copper and nickel may be selectively leached from a complex ore containing manganese, iron, copper, nickel, cobalt and molybdenum by leaching a reduced ore with a solution of an ammonium salt in ammonium hydroxide at approximately room temperature to remove the copper values and then leaching the residue at a higher temperature to extract the nickel.

BACKGROUND OF THE INVENTION

With the quantity and quality of the world's reserves of copper, nickel, cobalt and molybdenum rapidly diminishing the metallurgical industry is continually looking for better ways of increasing the recovery from present mineral sources and is vigilant in attempting to develop economically attractive processes to recover metal values from ores believed to be of little economic value. Pelagic sedimentary materials containing significant quantities of metal values have been known since late in the nineteenth century, however, no attempts have been made to recover the metal values therefrom. These pelagic sedimentary materials are considered to be complex ores which do not lend themselves to currently known extractive metallurgical processing techniques. Up to the present time these complex ores have only been found on the deep-sea floor of the oceans and lakes. Terrestrial ore beds containing manganese, iron, copper, nickel, molybdenum, cobalt and other metal values where the are has physical characterization similar to ocean floor ores have not as yet been discovered. However it is not unlikely that the same or similar type of complex ores will be located as terrestrial deposits. For the purpose of the remained of this patent specification these complex ores will be variously referred to as deep sea nodules, deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pats. Nos. 3,480,326 and 3,504,943.

The nodules invariably show an onionskin or concentric layer structure and are frequently oolitic within individual layers. However the nodules have no overall crystalline structure. The literature tells us that the nodules consist of a number of intimately and randomly intergrown crystallites of many minerals among which are barite, rutile, anatase, goethite, and several apparently new minerals of manganese. Attempts have been made to characterize these new manganese minerals by X-ray diffraction, electron diffraction and electron probe investigation without much success. Copper and nickel are not present in the nodule in the usual form found in terrestrial ores. It has been postulated that copper and nickel are present in the nodule as a result of substitution mechanism. It has not been possible, therefore, to determine the best method of extracting the mineral values from the deep sea manganese nodules, particularly copper, nickel, cobalt and molybdenum.

The character and chemical content of the deep sea nodules may vary widely depending upon the region from which the nodules are obtained. For a detailed chemical analysis of nodules from the Pacific Ocean see pages 449 and 450 in The Encyclopedia of Oceanography, edited by R. W. Fairbridge, Reinhold Publishing Corp., N.Y., 1966, and U.S. Pat. No. 3,169,856. For the purpose of this invention the complex ores will be considered as containing the following approximate metal content range on a dry basis.

METAL CONTENT ANALYSIS RANGE

|  | Percent |
|---|---|
| Copper | 0.8–1.8 |
| Nickel | 1.0–2.0 |
| Cobalt | 0.1–0.5 |
| Molybdenum | 0.03–0.1 |
| Manganese | 10.0–40.0 |
| Iron | 4.0–25.0 |

The remainder of the ore consists of clay minerals with lesser amounts of quartz, apatite, biotite and sodium and potassium feldspars. Of the many ingredients making up the manganese nodules, copper and nickel are emphasized because, from an economic standpoint, they are the most significant metals in most of the ocean floor ores. Cobalt and molybdenum may also be recovered by the processess of this invention.

The mining of the vast reserves of manganese deep sea nodules lying over the ocean floor, can best be economically justified, were a more economical process available to effect separation and ultimate recovery of the copper and nickel elements. The recovery of molybdenum and cobalt from these complex ores is also of economic interest.

Accordingly, among the objects of this invention are to provide a novel and improved process for extracting the copper and nickel from the complex ores or manganese deep sea nodules. Another object is to provide a novel and improved process for separating copper and nickel which process shall be simple and straightforward. Another object is to provide a novel and improved process for separating copper and nickel as found in manganese deep sea nodules, which process, at the same time facilitates the recovery of the cobalt and molybdenum elements contained in the nodules. Still another object of this invention is to provide a novel and improved process for separating the copper and nickel as found in manganese deep sea nodule deposits, which process provides simple but acurate controls for indicating substantially complete separation of such elements from each other.

SUMMARY OF THE INVENTION

Complex ores containing manganese, iron, copper, nickel, cobalt, molybdenum, etc., as exemplified by manganese nodules, are reduced in any convenient manner. The reduced ore is first leached in a first leaching step to remove substantially al of the copper and practically none of the other metal values in the ore by using a leaching solution containing from about 0.05 to about 1.0 molar concentration of an ammonium salt in aqueous ammonium hydroxide at about room temperature for about 30 seconds up to about one hour. In a second leaching step, the residue from the first leaching step is leached with a leaching solution that many contain up to about 2.0 molar concentration of an ammonium salt in aqueous ammonium hydroxide at a temperature of from about 50° C. to the temperature at which ammonia is expelled from the leach solution for a length of time sufficient to solubilize most of the nickel in the residue. The leach time may vary from about 30 minutes when a concentrated leach solution is used up to about four hours or more if a relatively more dilute leach solution is used. In the second leach most of the nickel is removed from the residue without removing any of the other metal values present in the ore. The copper and nickel may then be recovered from their respective leachates by the appropriate conventional processes such as electrowinning, hydrogen reduction, cementation, ion exchange or membrane separation techniques.

DESCRIPTION

In the first step of the process of this invention the manganese nodules are reduced in any convenient manner. For example, the nodules may be roasted in a gaseous reducing atmosphere. The most commonly used gases for this purpose are synthesis gas, hydrogen, carbon monoxide, mixtures of carbon monoxide and carbon dioxide, and mixtures of hydrogen and carbon monoxide. The atmosphere also may be a reducing one when the supply of oxygen in a reaction is only just sufficient to maintain the combustion. Another and preferred means of reduction is the direct reduction with carbon. The direct reduction may be accomplished with any carbon containing material that does not contaminate the manganese nodules in the roasting process. The preferred carbon containing materials are coal, oil, charcoal, crankcase oil, crude oil, bunker C fuel oil and cellulose. The process of reducing the complex ore with carbon containing materials is more fully described in co-pending application Ser. No. 55,608 filed July 16, 1970. Complex ore deep sea manganese nodules reduced by reaction with a reducing gas is described in co-pending patent application of M. J. Redman, Ser. No. 55,304 filed on July 16, 1970.

After the complex ore has been reduced it is then subjected to a first leaching step wherein the reduced ore is contacted with a solution of an ammonium salt in ammonium hydroxide for a period of time from about 30 seconds to no more than about 5 minutes. The ammonium salt may be, for example, ammonium carbonate or ammonium chloride. The first leach is preferably carried out at room temperature. However higher temperature leaches are possible if the time of contact between the leach solution and the reduced ore are carefully controlled. The leach solutions may contain from about 0.05 molar up to about 1 molar ammonium salt and from about 5 to 20% aqueous ammonia. The copper rich leach solution is then separated from the residue in any convenient manner.

The residue from the first leaching step is then contacted with a second leaching solution in a second leaching step. The leach solution may be the same as described above or may have a greater concentration, i.e. up to about 2 molar ammonium salt in aqueous ammonia. The second leaching step is carried out at an elevated temperature, for example between about 50° C. and the temperature at which ammonia is expelled from the leach solution. The contact time between the residue from the first leaching step and the second leaching solution is substantially longer than that of the first leaching step. The contact time may vary from as little as 30 minutes up to 16 or more hours. A reasonable contact time for economic considerations is from about 2 to 4 hours.

After a sufficient contact between the residue from the first leaching step and the second leaching solution, the nickel rich solution is separated in any convenient manner from the residue. The residue may be discarded or it may be further treated to obtain the manganese and iron therefrom.

The copper rich solution and the nickel rich solution are then treated in any known and convenient manner to recover the metal values therefrom.

The following specific examples are illustrative but not limitative of my invention, it being understood that similar improved results are obtainable with other combinations of different ingredients as specified above. All such variations which do not depart from the basic concept of the invention disclosed above are intended to come within the scope of the appended claims.

EXAMPLE 1

Manganese deep sea nodules were ground and mixed with 4, 5 and 6% by weight of the manganese nodules with coal. The coal and manganese nodule mixture was then roasted for one half hour at 650° C. or 800° C. as shown in the tabulation below. After roasting the reduced nodules were allowed to cool to room temperature. A 10 gram sample of the reduced nodule was then leached with a 100 milliliter portion of a 1 molar ammonium carbonate in 10% aqueous ammonia for the times indicated below.

| Expt. No. | Roasting conditions | Leach data | Percent extraction Cu | Ni |
|---|---|---|---|---|
| 1 | 800° C., 4% coal ½ hr | 2 min. at room temp | 98.0 | 0.6 |
| 2 | 650° C., 6% coal ½ hr | do | 82.8 | 0.2 |
| 3 | 800° C., 4% coal ½ hr | 1 min. at room temp | 79.7 | 0.3 |
| 4 | do | 4 hr. at 80° C. on residue from Expt. No. 3 | 19.6 | 52.4 |
| 5 | do | 5 min. at room temp | 50.9 | 1.8 |
| 6 | do | 4 hr. at 80° C. on residue from Expt. No. 5 | 44.3 | 56.1 |
| 7 | do | 15 min. at room temp | 89.6 | 10.4 |
| 8 | do | 4 hr. at 80° C. on residue from Expt. No. 7 | 9.4 | 45.6 |

The data indicates that by contacting the roasted nodule with a one molar ammonium salt in 10% aqueous ammonia solution for a short time, i.e. from about 1 to 5 minutes, that most of the copper can be removed from the nodule without removing a substantial portion of the nickel present in the reduced nodule. The residue from this first leach if subjected to a second leach using the same leach solution concentration for a longer period of time, i.e. 4 hours, a substantial portion of the nickel may be removed.

EXAMPLE 2

Manganese nodules were ground and mixed with the amount of coal or coke as indicated in the tabulation below. The mixture of nodules and coal or coke was placed in a furnace and the temperature in the furnace raised to 800° C. (except for Expt. No. 10). The furnace was then immediately shut off and the roasted nodules were allowed to cool in the furnace until room temperature was reached. The cool reduced nodules were then leached for 1 hour at room temperature with a relatively dilute leach solution containing approximately 0.2 molar ammonium carbonate and 2% aqueous ammonia. The residue from the first leach was then subjected to a second leach with a more concentrated leach solution, i.e. 1 molar ammonium carbonate and 10% aqueous ammonia for about 4 hours at 60 or 80° C. Typical separations are shown below. In these experiments most of the extractable molybdenum (about 85%) reports to the first leach, whereas the cobalt (about 35%) appears in the second leach.

| Expt. No. | Charge | Percentage extractions 1st leach Cu | Ni | 2d leach Cu | Ni | Temperature of 2d leach step, ° C. |
|---|---|---|---|---|---|---|
| 9 | 4.0% anthracite coal | 94.3 | 0.2 | 5.1 | 43.8 | 60 |
| 10 | 4.0% anthracite coal (900° C.) | 93.5 | 0.4 | 5.3 | 54.0 | 60 |
| 11 | 4.5% anthracite coal | [1]97.4 | 0.6 | 1.9 | 50.0 | 80 |
| 12 | 5.0% anthracite coal | 78.4 | 2.5 | 10.3 | 47.1 | 80 |
| 13 | 4.5% coke | 89.2 | 0.9 | 5.0 | 53.5 | 60 |
| 14 | 5.0% bituminous coal | 88.6 | 0.7 | 7.3 | 55.9 | 60 |

[1] First leach 2 minutes with concentrated solution (1 molar ammonium carbonate in 10% aqueous ammonia). All other first leaches one hour with dilute solution.

EXAMPLE 3

This example indicates that the leach time and concentration may be varied to produce the desired separation.

In these experiments ground manganese nodules were mixed with 4% by weight of the nodules of coal and roasted for about ½ hour at 800° C. The nodules were then allowed to cool to room temperature and leached with the various molar concentration of ammonium carbonate in aqueous ammonia leach solution for 30 minutes. The percentage extractions are shown in the tabulation below.

| Expt. No. | Leach solution concentration | Percentage extraction Cu | Ni |
|---|---|---|---|
| 17 | 1M $(NH_4)_2CO_3$ + 10% $NH_3$ | 72.8 | 32.0 |
| 18 | 0.5M$(NH_4)_2CO_3$ + 5% $NH_3$ | 66 0 | 1.7 |
| 19 | 0.2M$(NH_4)_2CO_3$ + 2% $NH_3$ | 71.4 | 0.4 |
| 20 | 0.1M$(NH_4)_2CO_3$ + 1% $NH_3$ | 71.4 | 0.3 |

By a proper adjustment of the leach solution concentration, leaching times, and leach solution temperatures, a very effective separation of nickel and copper may be carried out in a process stream of material immediately as received from the rosting kiln.

The drawing shows the flow sheet for a typical commercial process for covering copper rich and nickel rich leach solutions from a complex ore feed. The complex ore is preferably ground and reduced. The reduction may be accomplished by roasting at temperatures from about 350° C. to about 900° C. with an appropriate reducing agent such as coal, coke, oil or other high carbon containing materials such as cellulose, or wood pulp. The complex ore feed may also be reduced by contacting with an appropriate reducing gas at temperatures in the range from about 300 to 800° C. The reducing gas may be synthesis gas, water gas, mixtures of carbon monoxide-carbon dioxide mixtures of carbon monoxide-hydrogen, and gases made by the controlled combustion of natural gas and fuel oil. Reducing with a gaseous agent is preferably controlled to prevent the formation of metallic iron that is soluble in the leaching solutions. By selecting the appropriate reducing gas and reducing temperatures the valuable metals can be made to respond to the selective leaching procedure by minimizing the amount of iron capable of being solubilized.

The reduced nodules are then fed to a first leaching step. In the first leaching step the leach solution may be dilute, i.e, less than about 0.5 molar ammonium salt in less than about 5% aqueous ammonia, in which case the time of contact between the leach solution and the reduced nodule may be up to about 30 minutes. It is also possible to use a leach solution of higher concentrations, i.e. about 0.6 molar ammonium salt in 10 to 20% aqueous ammonia. If a concentrated leach solution is used the contact time may be in the order of minutes, for example from 1 to 5 minutes. After sufficient contact time in the first leaching stage the slurry is fed to a solid liquid separation. The copper rich solution is separated from the residue in any convenient method such as filtration or settling. The copper rich solution is then treated to remove the metal from the solution. The depleted solution may then be treated, enriched and fed back into one of the leaching stages.

The residue from the first leaching stage is then fed to a second leaching stage where a fresh concentrated leach solution, i.e. about 1 molar ammonium salt in 10 to 20% aqueous ammonia is contacted with the residue for an extended period of time. This time of contact is preferably from about 2 hours up to as long as 16 hours. The slurry from the second leach stage is fed to a solid liquid separation step where the nickel rich solution is removed from the slurry. The nickel rich solution is then treated to recover the metal therefrom in known manner. The residue from the second leach may be discarded or may be further treated to recover the valuable manganese and iron present therein.

What I claim is:

1. The process of recovering nickel and copper from manganese deep sea nodules wherein iron, copper and nickel are present in the deep sea nodules as oxides or mixed oxides and the manganese is present as manganese dioxide comprising the steps of
   (1) reducing the manganese deep sea nodules at a temperature of from about 350° C. to 900° C. with a reducing agent whereby the nickel and copper becomes leachable,
   (2) leaching in a first leaching step the reduced manganese deep sea nodules with leach solution containing an ammonium salt and aqueous ammonia whereby substantially all of the copper is selectively leached from the reduced manganese deep sea nodules and essentially none of the nickel,
   (3) separating a copper rich leach solution from a nodule residue,
   (4) leaching in a second leaching step the residue from the first leaching step with a solution containing an ammonium salt and aqueous ammonia for an extended period of time whereby substantially all of the nickel is removed from the residue,
   (5) separating a nickel rich leach solution from the nodule residue, and
   (6) recovering the copper and nickel from their respective metal rich leach solution.

2. The process of claim 1 wherein the reduced manganese deep sea nodules are leached with a leach solution containing from about 0.05 to about 2.0 molar concentration of an ammonium salt selected from ammonium chloride and ammonium carbonate and from about 1% to about 20% ammonia.

3. The process of selectively leaching copper and nickel from manganese deep sea nodules wherein iron, copper and nickel are present in the deep sea nodules as oxides or mixed oxides and the manganese is present as manganese dioxide comprising the steps of
   (1) reducing the manganese deep sea nodules to convert the manganese dioxide to manganese oxide,
   (2) leaching at ambient temperature, in a first leaching step, the reduced manganese deep sea nodules with a first aqueous leach solution containing from about 0.05 molar to about 1.0 molar ammonium salt and from about 1% to about 20% ammonia for a period of time sufficient to remove substantially all of the copper and essentially none of the nickel from the reduced deep sea nodule, the first leach period being from about 30 seconds to about one hour,
   (3) separating a copper rich leach solution from the first leaching step residue,
   (4) leaching at a temperature of from about 50° C. to the temperature at which ammonia is expelled from the leach solution, in a second leaching step, the residue from the first leaching step with a second aqueous leach solution contacting from about 0.5 molar to about 2.0 molar ammonium salt and from about 5% to about 20% ammonia for a period of time sufficient to remove substantially all of the nickel from the residue, the second leach period being from about 30 minutes to about 16 hours, and
   (5) separating the nickel rich leach solution from the residue.

4. The process of claim 3 wherein the ammonium salt is selected from ammonium chloride and ammonium carbonate.

References Cited
UNITED STATES PATENTS

| | | | |
|---|---|---|---|
| 3,471,285 | 10/1969 | Rolf | 75—103 |
| 2,719,082 | 9/1955 | Sproule | 75—7 |
| 3,450,523 | 6/1969 | Socolescu | 75—24 |
| 3,146,091 | 8/1964 | Green | 75—7 |
| 2,647,828 | 8/1953 | McGauley | 75—103 |

L. DEWAYNE RUTLEDGE, Primary Examiner

P. D. ROSENBERG, Assistant Examiner

U.S. Cl. X.R.

75—7, 103